May 20, 1969 H. SCHIPPERS ETAL 3,445,073
CONTROL AND SWITCHING ARRANGEMENT FOR MECHANICALLY OR
HYDRAULICALLY DRIVEN TRAVERSING MECHANISMS IN
SPINNING, WINDING AND ESPECIALLY RING
TWISTING MACHINES
Original Filed June 10, 1965 Sheet 1 of 2

INVENTORS
HEINZ SCHIPPERS
HANS LOHEST
JAN ROBERT DE RUIG
BY Margall Johnston Cook & Root
ATT'YS

United States Patent Office 3,445,073
Patented May 20, 1969

3,445,073
CONTROL AND SWITCHING ARRANGEMENT FOR MECHANICALLY OR HYDRAULICALLY DRIVEN TRAVERSING MECHANISMS IN SPINNING, WINDING AND ESPECIALLY RING TWISTING MACHINES
Heinz Schippers and Hans Lohest, Remscheid-Lennep, Germany, and Jan R. de Ruig, Arnhem, Netherlands, assignors to Barmer Maschinenfabrik AG, Wuppertal-Oberbarman, Germany
Continuation of application Ser. No. 374,114, June 10, 1965. This application Oct. 16, 1967, Ser. No. 675,712
Int. Cl. B65h 54/00, 57/28
U.S. Cl. 242—26.3    3 Claims

ABSTRACT OF THE DISCLOSURE

Control and switching means for traverse motion devices in which impulse producing means are used to fix the position of limit switches in accordance with a given winding program.

---

This is a continuation of application Ser. No. 374,114, filed June 10, 1965, now abandoned.

The present invention relates to control and switching means for traverse mechanisms that are used in producing windings in the textile industry. More particularly, the invention relates to control means for mechanically or hydraulically driven traverse-motion devices that fix the beginning and the end as well as the position of the traversing stroke and/or control the speed change at the ends of the stroke.

In mechanically or hydraulically driven traverse mechanisms, especially in ring twist machines, frequently for the limitation and control of the traverse or reciprocating stroke two limit switches are used which at the stroke ends reverse the movement of the traverse mechanism. It is also a known practice to displace the limit for the reasons to alter the length and/or position of the traverse stroke according to a program required for the build-up of a particular winding form or package. For the control of the displacing program there are used generally as a displacing member ordinary threaded spindles on which the limit switches to be displaced or the setting members or stops actuating these are mounted. Thus, for example, in one known winding arrangement the stroke-limiting members acting as limit switches for a reversing gear are mounted on a control shaft. These stroke-limiting members are mounted either at a fixed distance apart and in this, possibly, are positionally shiftable on the control shaft or they move in constant alteration of their distance apart on the spindle, each half of which has a thread in opposite direction, in the sense of increasing or reducing the stroke. It has also been proposed that the two stroke-limiting members each be mounted on their own threaded spindles, which are driven independently of one another over step-by-step switching mechanisms. Similar arrangements with a threaded spindle advancing the two limit switches or their adjusting members are usual in hydraulically driven traverse mechanisms for the limitation of the piston stroke transmitting the traverse motion. A device of this type is described in copending application Ser. No. 128,055, now Patent No. 3,169,714 the disclosure of which is herein incorporated by reference.

The types of winding and package forms achievable in the above manner are extremely varied. It is found, however, in the known arrangements to be a drawback that each requisite restoration and resetting of the limit switches after completion of a winding operation for the beginning of the following one is done by hand or by means of restoring devices which have to be especially actuated, and that a possible change in the control program involves still greater expenditure of work and time, because it makes necessary a changing of the control members. On the other hand a winding build-up which makes necessary during the winding formation a change of direction of the threaded spindles and thereby a directional reversal of the limit switches cannot be achieved with the known mechanisms. It is, however, precisely packages built up in this manner that are being preferred in practice to an increasing degree.

It is, therefore, an object of the invention to provide a control and switching device for such mechanically or hydraulically driven traverse mechanisms which, for the limitation of the traverse stroke necessary in the build-up of certain package forms, according to the length and position of said stroke as well as for reversing of the moment of the traverse drive at the stroke ends or stroke displacement ends into the opposite movement, uses two end switches and makes it possible universally to set in any desired traverse program and, furthermore, to carry out in a few moments any restoration of the traverse mechanism into the starting position for the particular traverse program and also the resetting of the control mechanism in a change of the control program.

In many cases it is necessary for the formation of the desired package, especially at the winding ends, to change the speed of the traverse movement during the individual stroke, and for this purpose there are generally used so-called output regulators or governors which vary the stroke speed of the working piston by controlling the volume of pressure fluid supplied per time unit. Such volume regulators, however, have to operate very precisely and be very accurately constructed. They are, therefore, complicated, subject to break down and expensive.

It is another objective of the invention, therefore, to simplify the control of such hydraulically driven traverse mechanisms at least insofar as the problem relates to the acceleration and retardation of the traverse movement.

In order to achieve the first objective set out above, it is proposed that in the program adjusting system which controls the conveyance movement of the setting members an electrically, magnetically or photoelectrically operating impulse-giver delivers switching impulses in dependence on the thread delivery speed or on the time to the drive of the adjusting members operating the limit switches or setting members, and that for each limit switch blocking switches are provided which determine the beginning and the end or reversal of the limit switch movement. In a preferred embodiment of this system, the program setting system consists essentially of an impulse giver and either a power switch or an impulse counter along with an amplifier, and can include an impulse preselector which transmits only the preselected determined impulses to the drive of the adjusting members.

The proposed measures are based, on the one hand, on the insight that what is essential for the drive of the control and switching mechanism in the formation of determined package forms is taking as a basis the thread delivery or the time, which enter into the package build-up as a fixed magnitude. Thus, hitherto in dependence on the impulse sequence of the traverse movement, for example impulse delivery at the stroke ends, in the building up of bicones produced in stroke diminution, because of the increasingly dense impulse sequence in time on the one hand and because of the winding layer thicknesses diminishing with increasing winding diameter on the other hand, it was necessary to accept into the bargain an uncontrollable and undesired flattening of the slope angle. This drawback is eliminated by the proposed measures. The object of the invention makes possible, in contrast, a considerable extension of the formation possibilities in the build-up of certain package forms and the maintenance of completely clean contours and stepless smooth transitions. Secondly, the adaptation of the machine necessary in case of change in the titer (denier), which otherwise was associated with considerable re-controlling operations, is automatically provided. Furthermore, there is now provided the possibility of carrying out the directional change of the limit switch movement during the package build-up in correspondence with the chosen type of winding.

In order to adjust the impulse sequence to the particular speed of the running thread, it is proposed, in further development of the idea of the invention, to use as impulse-giver an alternating voltage tacho machine, especially in pole-reversible execution, which is connected to the drive member determining the speed of the running thread, for example, a supplying godet. A further possibility for the adaptation to the thread speed consists in using as impulse-givers magnetically active inductive impulse-givers which are driven by the drive member determining the speed of the running thread, especially those with presettable impulse sequence. There the impulse sequence can be established also by means of a perforated card or a sound tape. Finally, it is possible for the impulse giving the feed frequency of the drive motor determining the speed of the running thread can be scanned by means of a rectifier and hereby the impulse sequence can be determined.

Especially in use of an alternating voltage tacho machine, magnetically active inductive giver or punch card or sound tape control, between the impulse-giver and the drive motor determining the speed of the running thread there can be arranged an electric synchronous drive connection, for example an electric shaft, in order to be able to tap the impulses at a suitable point.

On the other hand, the impulse sequence can also be established in dependence on the time, by a method such that the impulse-giver or givers are made entirely independent of the drives or movement mechanisms present in the machine and are driven by themselves, i.e., individually, for example by means of a separate motor.

The displacing members may be designed as threaded spindles, chains, bands, gear racks, control cams or the like and may be equipped with settable or adjustable limit switches of known constructional type or, analogously, with stops for such switches for the fixing of the particular length and position of the stroke movement, in which arrangement the limit switches or stops may be connected at the end of their conveyance path with a signalling, disconnecting or reversing device. Moreover, the drives of the devices conveying the limit switches may in each case be connected to separate program shifting systems and operate independently of one another. Such an arrangement of displacing members movable independently of one another makes possible, especially in hydraulically driven traverse mechanisms, the execution of any control program necessary for the making of any desired package form in all conceivable variants, thus, in particular, the fine adjustment for the individual thread denier.

For the drive of the displacing members for forward and reverse movement there may be used reversing motors of known type, such as, for example, monophase condenser motors or so-called Ferraris motors. Since such motors, however, have a differing slip, which is undesirable for a precise maintenance of a program, there is to be preferred over these, for the avoidance of slip, the use of the usual type mechanical step switching mechanisms. But because of the high wear on such devices and the low switching speed, in further development of the invention, it is proposed in a preferred embodiment that each displacing member be driven at will by means of one of two oppositely arranged direct current motors without current reverser in contact-free arrangement with exciter coils standing at an angle to each other (so-called step motors), which operate practically entirely without slip and mechanically very nearly without wear.

The combination of such electrical control and switching units, in themselves known, into a universal traverse control makes possible the adaptation of the package formation to the most diverse factors in textile installations and a technically faultless and sure as well as economically favorable execution of the most diverse traverse programs with stroke enlargement or diminution and/or stroke displacement in one-sense or opposite sense direction of movement for the production of cop, pirn, or biconical (pineapple) windings, in which system the adjustability of the impulse giving to the particular denier and the slope angle of the package (winding) as well as the adaptation to the particular speed of the running thread are to be stressed as particular advantages.

The embodiments of the subject invention can best be understood by reference to the attached drawing in which.

In a ring twist machine the raising and lowering of the ring or spindle rail as required for the building up of a package of a certain type of winding is accomplished by means of the traverse mechanism which transmits its program-controlled reciprocating movement over connecting lifter members to the rail to be moved.

Figure 1:
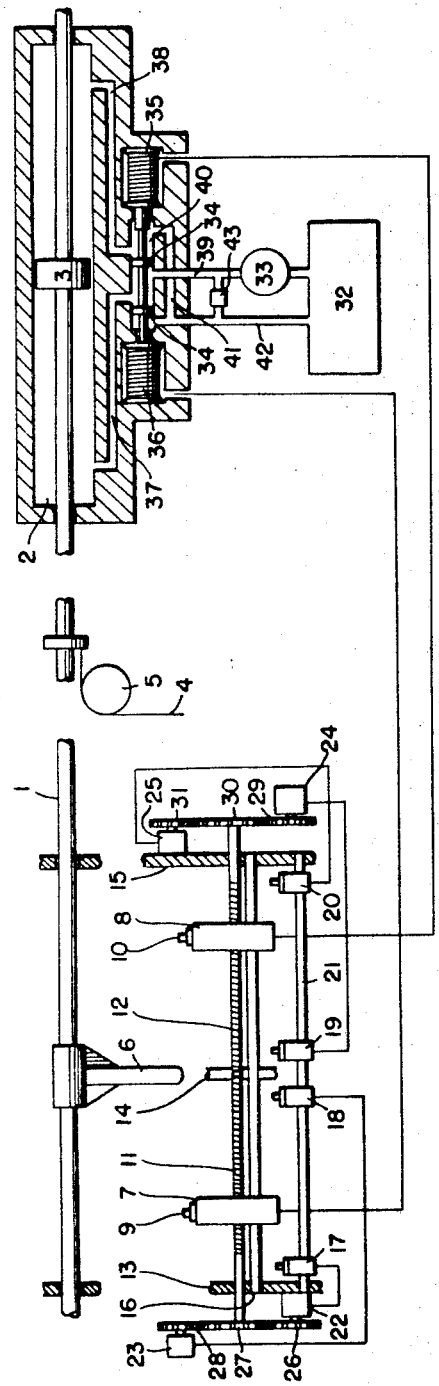
FIGURE 1 illustrates schematically a hydraulically driven traverse mechanism, for eample for ring twisting machines.

In the example of execution represented, the hydraulically driven traverse mechanism according to FIG. 1 consists essentially of the piston rod 1, which is pressed to the right or to the left by means of the working piston 3 conducted in a known manner by means of the hydraulic reversing drive in the cylinder 2, there being connected to working cylinder 2 a corresponding control conduit system for the pressure fluid. On the piston rod 1 there is attached one end of a pulling band 4 which, conducted over deflection roller 5, is connected at its other end with the ring or spindle rail (not shown) and transmits to this the movement of the working piston. Moreover, there is mounted on piston rod 1, control cam 6 which acts on the conrtol device of the traverse mechanism.

This control device consists substantially of the two switching blocks or carriages 7 and 8 with limit switches 9 and 10, possibly arranged displaceably and adjustably, mounted on them, of the two threaded spindles 11 and 12 guiding and moving the switching carriages, which spindles are borne independently of one another in bearings or stands 13, 14, 15, of the guide rod 16 which secures the switching carriages against twisting, and of the control bar 21 carrying the blocking or limit switches 17, 18, 19, 20. The two threaded spindles 11 and 12 are each individually drivable in both directions of rotation. In the example of execution represented there serves for this purpose in each case a pair of so-called step motors 22, 23, and 24, 25, respectively, which, over usual-type intermediate members, for example gear wheels 26, 27, 28 and 29, 30, 31, respectively, drive the threaded spindles 11 and 12, respectively in the particular direction switched. Such step motors are arranged in such a way that in the one direction of rotation they transmit force and in the other they idle, or conversely.

The hydraulic conduction system of known type consists essentially of supply tank 32 for the pressure fluid, pump 33, the control slide valve 34 along with its electromagnets 35, 36 connected to the limit swiches 9 and 10, and the pressure fluid lines 37, 38, which issue into the working cylinder 2 of the hydraulic reversing drive. The pump 33 draws the pressure fluid from the supply tank 32 and conveys it over the duct 39 into the conrtol cylinder 40, from which it is pressed, in the position shown for control slide valve 34, over duct 37 into the left-hand chamber of working cylinder 2. Hereby the working piston 3 is pushed to the right, and the fluid situated behind the piston in the working cylinder 2 is conveyed back through the duct 38 and the control cylinder 40 as well as the discharge ducts 41, 42 into the supply tank 32. By moving the control slide valve 34 to the right by means of electromagnet 35 there takes place a reversal of the liquid flow, which is now pressed over duct 39, control cylinder 40 and duct 38 into the right-hand chamber of working cylinder 2, whereby the working piston 3 is thrust to the left and the pressure fluid behind the piston is returned over duct 37, control cylinder 40 and duct 42 into the supply tank 32. Hereupon there again occurs the operation of the control slide valve 34 by means of the electromagnet 36 to the left and thereby the direction of the pressure fluid flow is again reveresed. Between the ducts 39 and 42 a safety valve 43 is arranged.

Such electrohydraulic controls are known. For the purposes of the present invention the reversing process is carried out by the alternate operation of the electromagnets 35 and 36, which in turn are connected to the power source or cut off from this power source in each case on striking of the control cam 6 on the limit switch 9 or 10 and thereby control the movement reversal of the working piston 3. The reciprocating piston movement whose speed is controllable by means of pump 33, is transmitted from the piston rod 1 over the connecting member 4 to the ring or spindle rail to be moved and, unless there occurs additionally on this path a reduction or a step-up gearing, is identical with the traverse movement.

For the control of the traverse movement according to certain programs, the two switching carriages 7 and 8 with the limit switches 9 and 10 mounted on them are moved by means of threaded spindles 11 and 12 into the required positions. A universally usable traverse mechanism requires for this purpose very extensive ranges of control for the displacement path to be covered in the time unit (period) and, therefore, very different displacing speeds for the various programs dependent on the thread delivery speed or on the winding period.

Figure 2:
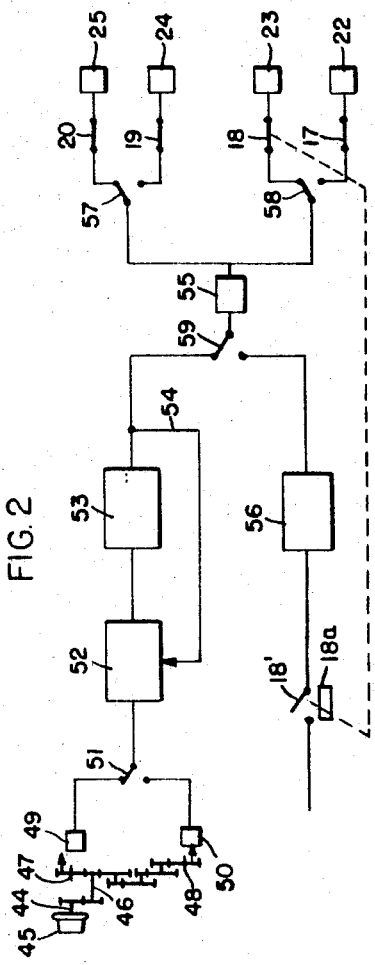
FIGURE 2 illustrates schematically the arrangement of the control and switching units for the execution of any desired control program in a traverse mechanism according to FIG. 1.

In the example of execution according to FIG. 2, a program control system is represented which controls the drive of the threaded spindles and thereby of their conveyance speed and, in so doing, takes into account the particular speed of the running thread.

To the drive shaft 44 of a thread delivery godet 45 there is connected a control gear 46 with two different speed reductions. On the output shafts 47 and 48, respectively, of the two reductions there is arranged in each case an impulse-giver 49 or 50, respectively, which operates, for example, magnetically, photoelectrically or simply mechanically and delivers its impulses proportional to the thread delivery speed. The switch-over from the one impulse-giver to the other takes place for the various types of winding by means of the selector switch 51.

It is likewise possible, at will, to operate from the output shafts 47 and 48 as impulse-giver a magnetic sound tape, a punch card or control cam, in which case, if need be, as extended arm an electrical shaft can be engaged between the driving shaft 44 or 47 and 48, respectively, and the impulse-giver.

It would be entirely possible to direct the impulses to the drive mechanism of the threaded spindles that convey both of the shift carriages directly over a power switch. Because of the very great differences in the required operating speeds, especially in the case of very different thread deniers and the various types of winding, especially between cop, pirn and biconical windings with the changes and/or displacements of the traverse stroke hereby conditioned, it is recommended in a preferred embodiment that there be used for the switching an impulse reduction gear settable for a reduction range of 1:1 to 1:100 between the impulse-giver and the step motors. It is then easily possible to execute traverse assignments in which, for example the particular stroke displacement is only 0.01 mm. per impulse. At such a conveying movement of the limit switches there results for 60 mm. stroke reduction 6,000 impulses. In the processing of the finest thread denier the machines run up to 24 hours in order to obtain the desired package form (winding form), so that, therefore with 24×60×60/6000 an impulse must occur about every 15 seconds. In processing relatively heavy thread deniers, especially in the case of plain distribution windings, on the other hand, the limit switches 9 and 10 at constant distance apart must be run considerably faster, and there is needed, for example, for the traverse path of 10 mm. correspondingly 1000 impulses only about 5 minutes, so that, therefore, with 5×60/1000 now an impulse must occur about every third of a second, which corresponds to an impulse sequence of about 3 impulses a second and yields, as compared to the previous example, about 50 times as rapid an impulse sequence.

In the example of execution, therefore, an impulse counter 52 is provided, which may be constructed in the usual mechanical type or of two decadically arranged counting magnets or electronically. The impulse preselection can then be set on two decadic rows of keys on the selector 53. When the counter 52 has reached the desired impulse sequence, then a stepping impulse is transmitted to the drive mechanism of the winding spindles and simultaneously the counter 52 is restored to its starting position over a reset impulse giver 54, whereupon the counter begins to count anew. Each stepping impulse is expediently fed first to an amplifier 55, since especially magnetic or electronic counters have only weak output signals.

In order to achieve a reciprocal influencing of the conveyor motor magnets, the amplifier 55 in the example of execution may be equipped with a bistable flip switching with amplifier stages engaged in series. To the bistable flip switching there can be also connected two astable time switches, in themselves known, for the purpose of impulse formation and precise transmission of impulses and thereby for the increase of the operational reliability. This has, moreover, the advantage that the conveyor motors are not constantly subjected to current.

By means of the selector switch 51, the drive mechanism of the winding spindles can be adjusted to whichever control program the individual conveyor motor belongs.

The end of the traversing process can be signaled by one of the limit switches 17, 18, 19, 20, and, namely, in the example represented, by the limit switch 18, which may be arranged simultaneously to switch off the main drive and, moreover, switches the switches 57, 58, 59. Thereupon, the threaded spindles 11 and 12, which are here driven in reverse by their corresponding second motor, run in high gear into the starting position, at which the return movement is switched off by, in each case, the other limit switch 17. The turning back of the threaded spindles 11 and 12 is controlled by a special impulse giver 56, which delivers its impulse to the above mentioned second motors, and can take place at a high impulse sequence, for example at about 12,000 impulses per minute and, correspondingly, be completed in fractions of a minute. If the impulse giver 56 is connected to the 50 Hz. (cycles per sec.) main, it is possible to transform the negative half waves into positive impulses, so that 6,000 impulses per minute result. The restoration time, therefore, will be even much shorter than the time required, according to experience, for the changing of full spools for empty ones.

The switch contact 18' is connected to a source of power to energize return impulse giver 56. It is connected mechanically or electrically (illustrated by the broken line in FIG. 2) to switch 18 so that it closes when switch 18 opens. It may have a holding circuit 18a conventionally used on holding relays to keep it closed until the switch block or carriage 7 contacts switch 17 whereupon the switch 17, by conventional circuitry (not shown), deactivates the holding circuit 18a and causes switch contact 18' to open.

The aforesaid switching of switches 57, 58 and 59 by limit switch 18 may be accomplished by conventional circuitry. For example, switches 57, 58 and 59 may be conventional solenoid switches which, when deenergized, are in the position shown in FIG. 2. The solenoids are connected by circuitry (not shown) to the power source through switch contact 18'. When switch contact 18' closes upon deenergization of its holding circuit 18a upon contact of switch 18 by the switch block or carriage 7, the solenoids are energized through switch contact 18' whereupon switches 57, 58 and 59 switch to their other contact position. This deenergizes motors 23 and 25 and energizes motors 22 and 24, reversing the direction of rotation of spindles 11 and 12. Switch 18 returns immediately to its closed position but switch contact 18' is held closed. When the block or carriage 7 contacts the limit switch 17 and causes it to open, there may be provided a contact on switch 17 for deactivating the holding circuit 18a whereby switch contact 18' opens to deenergize return impulse giver 56 and switches 57, 58 and 59, whereby they return to the position shown in FIG. 2.

Figure 3:
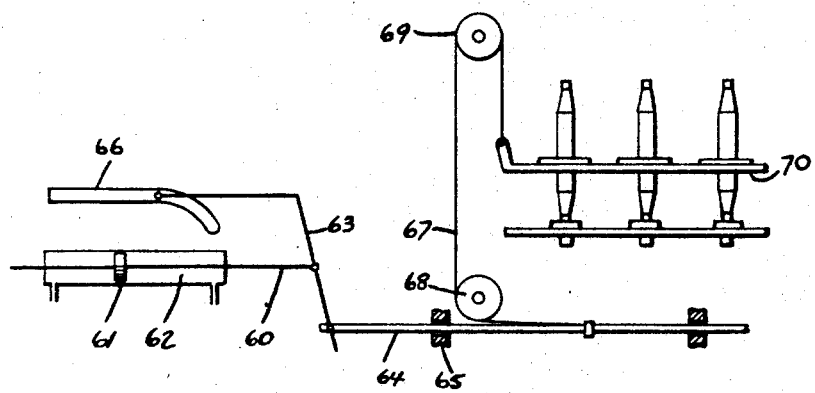
FIGURE 3 illustrates schematically the use of linked or two-armed lever means for controlling the speed of the traverse movement during the individual stroke.

In FIG. 3 at the end of piston rod 60, which is reciprocated in known manner by means of the piston 61 moved in the cylinder 62 of a hydraulic reversing drive, the link 63 is rotatably mounted, which is attached at its one end to traverse rod 64 guided in machine frame 65 and is supported with its other end on or in the guide slot 66. On traverse rod 64 there is attached the traction band 67, which, conducted over deflection rollers 68 and 69, connects the traverse rod with the ring rail 70 and transmits the traverse motion to this latter. The guide slot represented schematically in the example of execution may be bent at its two ends, in order in this manner to effect an acceleration of the traverse motion at the ends of the traverse stroke. Furthermore, the guide slot, which, incidentally, may have any desired form adapted to a certain control program, may be adjustable or displaceable in various positions.

Obviously many modifications and variations of the invention as hereinbefore set forth may be made without departing from the spirit and scope thereof, and therefore only such limitations should be imposed as are indicated in the appended claims.

We claim:
1. A traverse motion device in combination with a ring rail and lifter elements supporting said rail for reciprocation thereof for producing thread windings which comprises: piston means to drive said lifter elements, threaded spindles associated with said piston means, said spindles being traversed by said piston means, and control means for establishing the length of a stroke in a given direction and for reversing said direction, said control means including movable limit switches on said spindles, a motor operatively connected to each of said spindles, each said motor serving to turn said spindle connected to it and thereby move said limit switches, and impulse producing means for fixing the position of said limit switches in accordance with a given winding program, said impulse producing means being operatively associated with each said motor whereby the produced impulses control the speed of each said motor.

2. A traverse motion device in combination with a ring rail and lifter elements supporting said rail for reciprocation thereof for producing thread windings which comprises: piston means to drive said lifter elements, threaded spindles associated with said piston means, said spindles being traversed by said piston means, and control means for establishing the length of a stroke in a given direction and for reversing said direction, said control means including movable limit switches on said spindles, a motor operatively connected to each of said spindles, each said motor serving to turn said spindle connected to it and thereby move said limit switches, and impulse producing means for fixing the position of said limit switches in accordance with a given winding program, said impulse producing means being operatively associated with each said motor whereby the produced impulses control the speed of each said motor, and means operating said impulse producing means in accordance with the delivery speed of said thread.

3. A traverse motion device as claimed in claim 2 wherein said last-mentioned means includes a rotatable thread delivery godet rotated by the thread being delivered to the thread winding.

References Cited
UNITED STATES PATENTS

| | | |
|---|---|---|
| 2,539,267 | 1/1951 | Nikles. |
| 2,749,055 | 6/1956 | Bauer. |
| 3,042,326 | 7/1962 | Lamb et al. |
| 3,109,602 | 11/1963 | Smith. |
| 3,169,714 | 2/1965 | Schippers. |
| 3,188,013 | 6/1965 | Geen. |

STANLEY N. GILREATH, *Primary Examiner.*

U.S. Cl. X.R.
242—158